(12) United States Patent
Power et al.

(10) Patent No.: US 11,084,467 B2
(45) Date of Patent: Aug. 10, 2021

(54) BRAKE CONTROLLER SYSTEM COMPRISING A TRAILER MOUNTED BRAKE CONTROLLER AND A TOWING VEHICLE MOUNTED BRAKE CONTROLLER

(71) Applicant: Robert Bosch GmbH, Stuttgart (DE)

(72) Inventors: Michael Power, Tecoma (AU); Philipp Frueh, Clayton South (AU)

(73) Assignee: Robert Bosch GmbH, Stuttgart (DE)

( * ) Notice: Subject to any disclaimer, the term of this patent is extended or adjusted under 35 U.S.C. 154(b) by 314 days.

(21) Appl. No.: 16/401,838

(22) Filed: May 2, 2019

(65) Prior Publication Data

US 2020/0055496 A1 Feb. 20, 2020

(30) Foreign Application Priority Data

Aug. 17, 2018 (DE) .......................... 102018213854.0

(51) Int. Cl.
*B60T 8/17* (2006.01)
*B60T 8/58* (2006.01)

(52) U.S. Cl.
CPC .............. *B60T 8/1701* (2013.01); *B60T 8/58* (2013.01); *B60T 2240/00* (2013.01); *B60T 2250/00* (2013.01); *B60T 2250/04* (2013.01)

(58) Field of Classification Search
CPC ...... B60T 8/1701; B60T 8/58; B60T 2250/00; B60T 2240/00; B60T 2250/04; B60T 7/20; B60T 2270/406; B60T 8/1708; B60T 8/248
See application file for complete search history.

(56) References Cited

U.S. PATENT DOCUMENTS

| | | | |
|---|---|---|---|
| 6,364,432 B1* | 4/2002 | Mixon | B60T 7/20 303/124 |
| 6,499,814 B1* | 12/2002 | Mixon | B60T 7/20 303/124 |
| 2003/0117011 A1* | 6/2003 | Ackley | B60T 13/686 303/7 |
| 2008/0143179 A1* | 6/2008 | Rutherford | B60T 7/20 303/160 |
| 2010/0152989 A1* | 6/2010 | Smith | B60T 7/085 701/78 |

(Continued)

*Primary Examiner* — Russell Frejd
(74) *Attorney, Agent, or Firm* — Norton Rose Fulbright US LLP; Gerard Messina

(57) ABSTRACT

A brake controller system includes a trailer mounted brake controller and a towing vehicle mounted brake controller, where the controllers exchange signals and data via a communication network so that braking actions of each of the trailer and the towing vehicle can be coordinated based on current driving statuses of the other, and where the trailer mounted brake controller includes a first interface receiving trailer status signals from sensors of the trailer; a second interface for receiving towing vehicle status signals, relating to a status of the towing vehicle and/or its mounted controller, from sensors and/or controllers in the towing vehicle; a third interface for transmitting brake control signals to brakes of the trailer; and a signal processor for generating the brake control signals based on the trailer and towing vehicle status signals.

18 Claims, 1 Drawing Sheet

(56) References Cited

U.S. PATENT DOCUMENTS

| | | | |
|---|---|---|---|
| 2011/0042154 A1* | 2/2011 | Bartel | B60L 50/20 |
| | | | 180/11 |
| 2016/0023642 A1* | 1/2016 | Smith | B60T 7/20 |
| | | | 303/20 |
| 2017/0217411 A1 | 8/2017 | Albright et al. | |

* cited by examiner

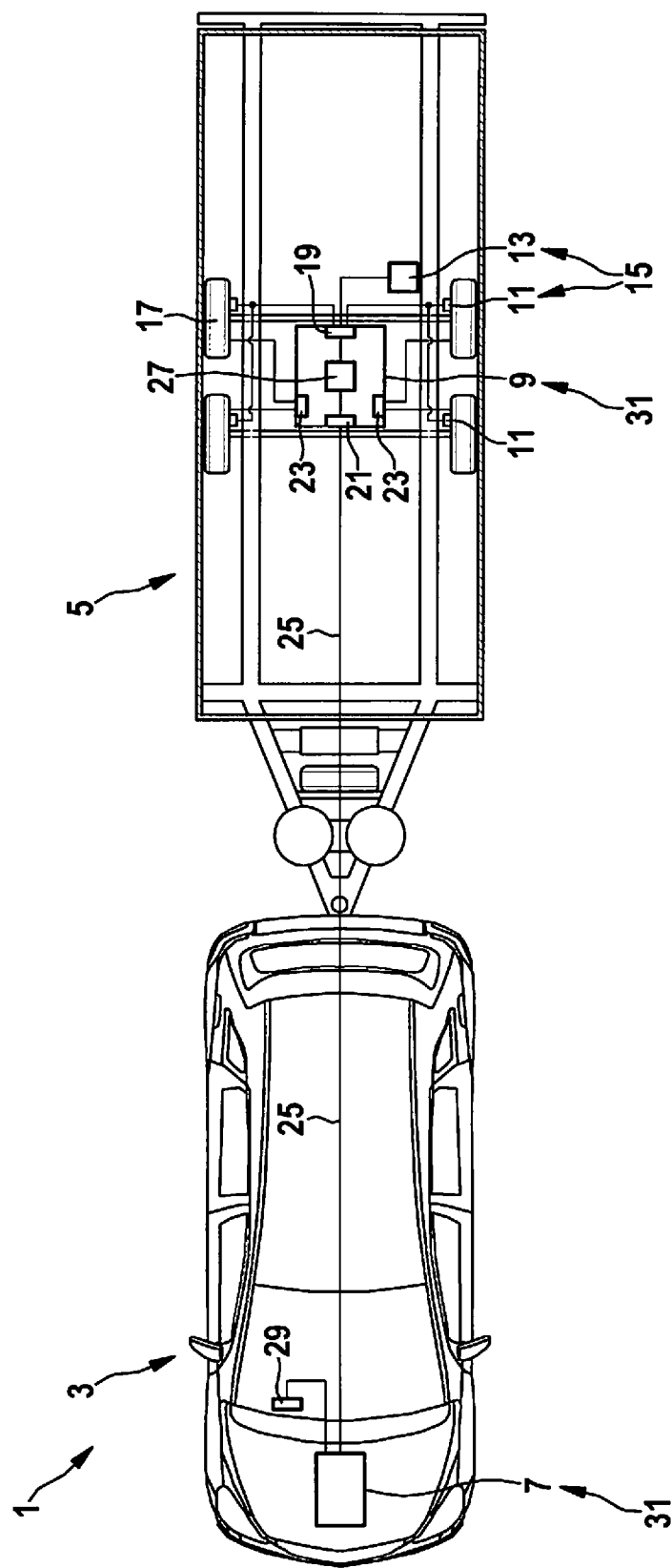

BRAKE CONTROLLER SYSTEM COMPRISING A TRAILER MOUNTED BRAKE CONTROLLER AND A TOWING VEHICLE MOUNTED BRAKE CONTROLLER

CROSS-REFERENCE TO RELATED APPLICATIONS

The present application claims priority under 35 U.S.C. § 119 to DE 10 2018 213 854.0, filed in the Federal Republic of Germany on Aug. 17, 2018, the content of which is hereby incorporated by reference herein in its entirety.

FIELD OF THE INVENTION

The present invention relates to a distributed brake controller system in a vehicle train comprising a towing vehicle and a connected trailer. Particularly, the present invention relates to a trailer mounted brake controller and to a towing vehicle mounted brake controller and the communication between them.

BACKGROUND

A trailer is towed by a towing vehicle such as a car. Generally, a driver drives the car and the driver's intention to accelerate or decelerate the car directly or indirectly affects the trailer. For example, the trailer can comprise brakes that are actuated when the driver actuates the towing vehicle's brakes such that the towing vehicle is decelerated.

In some regions such as Europe, the brakes of the trailer are typically mechanically actuated by and coupled to the towing vehicle. In regions such as North America and Australia, an electric trailer brake controller is typically utilized in the towing vehicle and controls actuation of the brakes of the trailer. In such an approach, the brakes of the trailer are typically electrically actuated brakes including for example a magnetic solenoid and the brakes of the trailer are activated upon receiving an electric activation signal from the trailer brake controller. In North America and Australia, there are also so called electric over hydraulic brake actuators on the trailer. The electric brake signal goes to the electric over hydraulic brake actuator. The brake actuator creates a hydraulic pressure proportional to the electric signal and applies the hydraulic trailer brakes. The present invention can also be applied to such system.

Conventionally, the trailer brake controller is located within the towing vehicle and generates the electric activation signal only based on information about an actuation of a brake pedal and measured deceleration in the towing vehicle. Optionally, manual adjustments can be implemented by the driver via a manual control device allowing for example adapting a brake intensity to be realized by the brakes of the trailer.

U.S. pat. App. Pub. No. 2017/0217411 discloses a brake control unit and a method for controlling braking of a towed vehicle including receiving a first signal via a communication bus of a towing vehicle, the first signal relating to at least one operating condition of at least one of the towing vehicle and a towed vehicle, and sending a second signal to brakes of the towed vehicle, the second signal being based on said first signal.

SUMMARY

In view of this background, an approach described herein presents a trailer mounted brake controller, a towing vehicle mounted brake controller, and a brake controller system including both brake controllers, as well as a trailer, a towing vehicle, and a vehicle train including such brake controllers and brake controller system.

Embodiments of the invention can enable braking of a vehicle train including a towing vehicle and trailer in a more secure and/or more effective manner.

According to an example embodiment of the present invention, a trailer mounted brake controller controls operation of brakes in a trailer. The trailer mounted brake controller includes: a first signal interface for receiving trailer status signals from sensors in the trailer, the trailer status signals relating to a current driving status of the trailer; a second signal interface for receiving towing vehicle status signals from at least one of sensors and controllers in a towing vehicle towing the trailer, the towing vehicle status signals relating to at least one of a current driving status of the towing vehicle and an operation status of a towing vehicle brake controller; a third signal interface for transmitting brake control signals to brakes of the trailer; and a signal processor configured for generating the brake control signals taking into account both the trailer status signals and the towing vehicle status signals.

According to an example embodiment of the present invention, a towing vehicle mounted brake controller for controlling operation of brakes in a towing vehicle includes: a first signal interface for receiving trailer status signals from sensors in a trailer towed by the towing vehicle, the trailer status signals relating to at least one of a current driving status of the trailer and an operation status of a trailer mounted brake controller; a second signal interface for receiving towing vehicle status signals from at least one of sensors and controllers in the towing vehicle, the towing vehicle status signals relating to a current driving status of the towing vehicle; a third signal interface for transmitting brake control signals to brakes of the towing vehicle; and a signal processor being configured for generating the brake control signals taking into account both the towing vehicle status signals and the trailer status signals.

According to an example embodiment of the present invention, a brake controller system includes a trailer mounted brake controller as described above and a towing vehicle mounted brake controller as described above.

According to an example embodiment of the present invention, a trailer includes a trailer mounted brake controller as described above and a towing vehicle including a towing vehicle mounted brake controller as described above.

According to an example embodiment of the present invention, a vehicle train includes a towing vehicle as described above and a trailer as described above, where the towing vehicle status signals are supplied to the second interface of the trailer mounted brake controller via a vehicle communication network interconnecting the towing vehicle mounted brake controller and the trailer mounted brake controller and/or where the trailer status signals are supplied to the first interface of the towing vehicle mounted brake controller via the vehicle communication network interconnecting the towing vehicle mounted brake controller and the trailer mounted brake controller.

Ideas underlying embodiments of the present invention can be interpreted as being based, inter alia, on the following observations and recognitions.

Recently, a trailer mounted brake controller has been developed which does not simply send brake activation signals to the brakes of the trailer, the brake activation signals taking into account a brake pedal actuation and, optionally, further data relating to the towing vehicle.

Instead, various sensors are provided in the trailer itself and the developed trailer mounted brake controller generates brake activation signals taking into account the trailer-related signals from these sensors. Particularly, such trailer mounted brake controller can provide operation of features similar to an ABS (anti-lock braking system) or an ESC (electronic stabilization control—sometimes also referred to electronic stabilization program (ESP)) as known from modern cars. Therein, the trailer mounted brake controller can receive for example wheel speed data from rotation rate sensors provided at wheels of the trailer and/or acceleration data provided from acceleration sensors within the trailer. The trailer mounted brake controller can then generate the brake activation signals taking into account the current driving status of the trailer as indicated, inter-alia, by the wheel speed data, acceleration data, and possibly further data influenced by current conditions in the trailer or acting on the trailer. Thereby, the trailer brake control can generate the brake activation signal such that a stabilization of the trailer during a braking process can be achieved and/or a braking efficiency can be improved.

It has now been found that further improvements during braking a vehicle train including a towing vehicle and a trailer can be achieved by specifically configuring the brake controller of the trailer and/or of the towing vehicle and interconnecting the trailer and the towing vehicle via a vehicle communication network in such a manner that the trailer mounted brake controller and/or the towing vehicle mounted brake controller do not only take into account status signals relating to its associated part of the vehicle train but also status signals relating to the other part of the vehicle train. In other words, the trailer mounted brake controller and the towing vehicle mounted brake controller should take into account both, the trailer status signals and the towing vehicle status signals, when generating the brake control signals for braking the trailer or the towing vehicle, respectively.

Taking into account status signals from the other part of the vehicle train can enable that the respective brake controller generates brake control signals for its associated part of the vehicle train not only taking into account the current driving status of this associated part of the vehicle but also the driving status of the other part of the vehicle train.

For example, the trailer mounted brake controller can take into account, not only the trailer status signals relating to the current driving status of the trailer, but can also the towing vehicle status signals relating to the current driving status of the towing vehicle and/or to an operation status of the towing vehicle brake controller.

For example, upon communicating with the towing vehicle and, e.g., with a ESC system in the towing vehicle, the trailer mounted brake controller can learn that this ESC system is currently detecting an imminent locking of wheels of the towing vehicle during a braking procedure. Upon such information, the trailer mounted brake controller can decide to temporarily reduce brake actuation intensity such as to anticipate a lacking grip to the street and avoid any blockage of wheels of the trailer.

Generally, the towing vehicle status signals can include at least three types of data including longitudinal acceleration data, lateral acceleration data, yaw rate data, accelerator pedal data, brake pedal data, wheel speed data, driver steering input data, and vehicle braking status data, all data relating to the towing vehicle.

In other words, while, conventionally, brake control signals are generated taking into account brake pedal data indicating a brake pedal actuation in the towing vehicle and, optionally, vehicle braking status data indicating a status during a braking procedure of the towing vehicle, it is now proposed to take into account at least one further type of data. This further type of data is typically supplied by sensors in the towing vehicle and is generally processed in brake controllers or drive assistance systems in the towing vehicle.

For example, such further type of data can be longitudinal acceleration data indicating a current longitudinal acceleration of the towing vehicle along a drive direction, lateral acceleration data indicating a current lateral acceleration of the towing vehicle transverse to the drive direction, yaw rate data indicating a current yaw rate of the towing vehicle upon yawing around a vertical axis, and/or wheel speed data indicating a current rotation speed or rotation rate of one or more wheels of the towing vehicle. Based on such towing vehicle status data, the trailer mounted brake controller can derive information indicating for example whether the towing vehicle is currently heavily decelerating, is in a side motion, is yawing, etc. This information can then be used by the trailer mounted brake controller for more suitably generating the brake control signals for braking the trailer.

Additionally, the towing vehicle status signals can further include at least one of ON/OFF status data and operation mode data of the towing vehicle brake controller. In other words, the towing vehicle status signals can additionally include ON/OFF status data providing an information indicating whether or not the brake controller of the towing vehicle is currently operating or not. Additionally or alternatively, operation mode data can provide an information about a current operation mode in which the towing vehicle mounted brake controller is currently operating.

Similarly, the trailer status signals can comprise at least one of longitudinal acceleration data, lateral acceleration data, yaw rate data, wheel speed data, brake operation data, ON/OFF status data and operation mode data of the trailer brake controller, trailer status information data, fault/shutdown data, and driver information data, all data relating to the trailer. Status information can include fault/operation/shutdown status of the brake controller when a fault condition occurs. Status could also be odometer data, service interval alerts, and maintenance warnings for an attached trailer. Hardware monitoring on the trailer can also be provided, e.g., as trailer stand/jockey wheel up/down, trailer park brake on/off, trailer hitch latch secured/not secured, etc. Numerous status of various sensors can be added in the future, brake hardware status (temperatures, bearing vibration, etc.), etc.

According to an embodiment, the towing vehicle mounted brake controller can further include a signal output device for outputting an indicator signal in the towing vehicle depending on the trailer status signals. The signal output device can output the indicator signal visually, acoustically, haptically, or in any other way perceptible by the driver. For example, the signal output device can be a set of light sources such as LEDs, a display, a screen, a loudspeaker, etc. By including such signal output device into the towing vehicle brake controller, additional information can be supplied to the driver, such additional information relating for example to an operation status of the trailer mounted brake controller and/or to a current driving status of the trailer.

According to an embodiment of the vehicle train including the towing vehicle and the trailer, the vehicle communication network can be a CAN-bus network, a Flex-ray network, a LIN network or an Ethernet network. Optionally, also wireless networks such as e.g., Bluetooth, WiFi, etc. can be applied. All such types of networks can be applied in vehicles for exchanging signals and data for example between sensors and/or controllers. In the approach described herein, such networks can be used for exchanging trailer status signals and/or towing vehicle status signals from the trailer towards the towing vehicle, or more specifically from the trailer mounted brake controller towards the towing vehicle brake controller, and/or vice versa from the towing vehicle towards the trailer.

Particularly, the vehicle communication network can be configured for transmitting signals bi-directionally between the towing vehicle and the trailer. In other words, signals or data can be transmitted via the vehicle communication network in a first direction for example from the towing vehicle mounted brake controller towards the trailer mounted brake controller and/or in an opposite direction from the trailer mounted brake controller towards the towing vehicle mounted brake controller.

Example features and advantages of the invention are described herein with reference to embodiments relating to the trailer mounted brake controller, the towing vehicle mounted brake controller, and the brake controller system including both brake controllers, and to a trailer, a towing vehicle, and a vehicle train including such brake controllers. One skilled in the art understands that features can be suitably combined, adapted, and/or exchanged in order to arrive at further embodiments of the invention.

Embodiments of the invention will be described in the following in relation to the enclosed drawing, which is only represented in a schematic manner and is not to scale. Neither the drawing nor the description shall limit the invention.

BRIEF DESCRIPTION OF THE DRAWING

The FIGURE shows a vehicle train including a towing vehicle and a trailer including a brake controller system with a towing vehicle mounted brake controller and a trailer brake mounted controller according to an example embodiment of the present invention.

DETAILED DESCRIPTION

The FIGURE shows a vehicle train 1 including a towing vehicle 3 and a trailer 5. The towing vehicle 3 includes a towing vehicle mounted brake controller 7. The trailer 5 includes a trailer mounted brake controller 9.

In the trailer 5, various sensors 15 are provided. For example, wheel sensors 11 can sense wheel speed data or rotation rate data of wheels 17 of the trailer 5. Furthermore, an inertial sensor 13 can provide data about longitudinal accelerations, lateral accelerations, and/or a yaw rate in the trailer 5. All these sensors 15 can provide trailer status signals to the trailer mounted brake controller 9, these trailer status signals relating to a current driving status of the trailer 5.

Similarly, various sensors (not explicitly shown) are provided in the towing vehicle 3 and provide towing vehicle status signals to the towing vehicle mounted brake controller 7 for providing information relating to a current driving status of the towing vehicle 3.

The towing vehicle 3 and its towing vehicle mounted brake controller 7 are connected via a vehicle communication network 25 to the trailer 5 and its trailer mounted brake controller 9. The vehicle communication network 25 can transmit signals and data bi-directionally, i.e., from the towing vehicle 3 to the trailer 5 and vice versa.

Accordingly, the trailer mounted brake controller 9 can receive towing vehicles status signals from at least one of the sensors or controllers provided in the towing vehicle 3 via a second signal interface 21.

Taking into account both, the trailer status signals as well as the towing vehicle status signals, a signal processor 27 in the trailer mounted brake controller 9 can generate brake control signals to be submitted to brakes provided at the wheels 17 of the trailer 5 via a third signal interface 23.

Similarly, the towing vehicle mounted brake controller 7 can include first, second and third signal interfaces (not explicitly shown) for receiving the trailer status signals, for receiving the towing vehicle status signals and for transmitting the brake control signals to brakes of the towing vehicle, the brake control signals having been generated by a signal processor taking into account both, the towing vehicle status signals and the trailer status signals.

As part of the towing vehicle mounted brake controller 7, a signal output device 29 can be provided within the towing vehicle 3 for outputting an indicator signal depending on the trailer status signals. The signal output device 29 can receive the trailer status signals via the data communication network 25. The trailer status signals can be processed or can be directly output as indicators signals. For example, such trailer status signals can indicate whether or not the trailer mounted brake controller 9 is currently operating correctly. Optionally, the signal output device 29 can also include input means allowing for example a driver to manually input data, thereby for example modifying characteristics of the trailer mounted brake controller 9. The signal output device 29 can be for example a screen or a set of LEDs.

In the following, possible features and advantages of embodiments of the brake controllers, brake controller system, trailer, towing vehicle, and vehicle train proposed herein will be described in more detail with respect to exemplary implementations.

Electric trailer braking control from the tow-vehicle to the trailer is currently generally performed by a single service brake signal. This service brake signal generally adjusts a braking power level to the trailer based on very simplified settings of driver braking gain selection, in-vehicle brake controller inertia and a number of uncontrollable settings (signal voltages, wire and connector resistances). Electric Trailer Brake Controllers are supplied as either an OEM vehicle integrated controller or as an aftermarket installation.

Existing electric braking systems from the tow-vehicle to the trailer can have a multitude of control issues from locking trailer wheels, to under braking the trailer, not detecting failures on the trailer braking systems. Non-synchronized control between the tow vehicle and the trailer can lead to sub optimal brake control.

Recently, a new trailer braking product has been developed, sometimes referred to as Trailer Safety Control (TSC). Embodiments of the invention described herein expand the developed system to more advanced control with the integration into existing tow vehicle trains. Particularly, an ESP ECU (electronic control unit) can have the ability for additional software-based Value Added Functions (VAF) offered to OEM manufacturers when quoting for the development of a new vehicle.

This proposal is for a new ESP ECU VAF sometimes referred to as "Advanced Trailer Control." This VAF will provide a communications channel from the braking System (ESP) on the tow vehicle to the TSC product, generally mounted on the towed trailer, via a vehicle communication network (i.e., CAN-bus, Flex-ray, LIN or Ethernet), and thereby provide an integrated braking control method between tow vehicle and trailer.

A system solution is to connect the trailer based TSC controller to the towing vehicle braking system, via vehicle communication network, for improved vehicle and trailer braking response, dynamics and driver feedback.

Embodiments of the proposed brake controller can be offered to OEM manufacturers as an advanced trailer control system. Particularly, this VAF can be of value to vehicles manufacturers and customers in the Australian and America market where the TSC product is to be applied, particularly to manufacturers that develop large towing vehicles that currently contain integrated electric trailer brake controllers. This VAF will allow manufacturers to add advanced trailer braking control to their vehicles for use by customers who own a trailer with a TSC product fitted.

Embodiments of the proposed brake controller can provide detailed driver intention information to the Trailer Safety Control System. Driver braking and vehicle control intentions can be sent to the TSC brake controller to improve overall vehicle-train braking control. Data sent could include but not be limited to driver pedal signals (accelerator, and brake pedal), steering input, and vehicle lights control data.

Furthermore, detailed vehicle dynamics information can be provided to the trailer brake controller. Tow Vehicle Dynamic information can be sent to the TSC braking controller to improve and increase the functionality in the TSC product. This could include tow vehicle inertia signals (Ax, Ay, Yaw), ESP System Status (ABS, TSC, ESP, HHC (hill hold control), HDC (hill descent control) active), Wheel Speed Information, and/or Vehicle Ignition Information. Numerous other signals from ESP can be utilized in further TSC function development.

A driver visual interface serving as signal output device can be provided for trailer control. Advanced driver feedback could be offered on the tow-vehicle instrument cluster for the trailer. Information provided could include braking operation, trailer warnings, trailer braking system status, trailer control enable disable, braking override operation, and many more.

Furthermore, detailed trailer dynamic information can be provided to the towing vehicle for brake control. The towing vehicle could improve its braked towing dynamics of functions such as ABS, ESP, HHC, and HDC with detailed trailer information including, inertia signals (Ax, AY, Yaw) of the trailer mounted TSC, and trailer braking functions (ABS, TSM) activation can be sent to the tow vehicle for improved control.

The term "comprising" does not exclude other elements or steps and the terms "a" or "an" do not exclude a plurality. Also, elements described in association with different embodiments can be combined.

What is claimed is:

1. A trailer mounted brake controller for controlling operation of brakes in a trailer, the trailer mounted brake controller comprising:
a first signal interface via which trailer status signals, relating to a current driving status of the trailer, can be received from sensors in the trailer;
a second signal interface via which towing vehicle status signals, relating to at least one of a current driving status of a towing vehicle towing the trailer and an operation status of a towing vehicle mounted brake controller mounted on or in the towing vehicle, can be received from at least one of sensors and controllers in the towing vehicle;
a signal processor, wherein the signal processor is configured to generate brake control signals taking into account both the trailer status signals and the towing vehicle status signals; and
a third signal interface via which the brake control signals are transmittable to brakes of the trailer.

2. The controller of claim 1, wherein the towing vehicle status signals include at least three of longitudinal acceleration data of the towing vehicle, lateral acceleration data of the towing vehicle, yaw rate data of the towing vehicle, accelerator pedal data of the towing vehicle, brake pedal data of the towing vehicle, wheel speed data of the towing vehicle, and vehicle braking status data of the towing vehicle.

3. The controller of claim 1, wherein the towing vehicle status signals include at least one of ON/OFF status data and operation mode data of the towing vehicle mounted brake controller.

4. The controller of claim 1, wherein the trailer status signals include at least one of longitudinal acceleration data of the trailer, lateral acceleration data of the trailer, yaw rate data of the trailer, wheel speed data of the trailer, brake operation data of the trailer, ON/OFF status data of the trailer, operation mode data of the trailer mounted brake controller of the trailer, trailer status information data of the trailer, and driver information data of the trailer.

5. A towing vehicle mounted brake controller for controlling operation of brakes in a towing vehicle, the towing vehicle mounted brake controller comprising:
a first signal interface via which trailer status signals, relating to at least one of a current driving status of a trailer towed by the towing vehicle and an operation status of a trailer mounted brake controller mounted on or in the trailer, can be received from sensors in the trailer;
a second signal interface via which towing vehicle status signals, relating to a current driving status of the towing vehicle, can be received from at least one of sensors and controllers in the towing vehicle;
a signal processor, wherein the signal processor is configured to generate brake control signals taking into account both the towing vehicle status signals and the trailer status signals; and
a third signal interface via which the brake control signals are transmittable to brakes of the towing vehicle.

6. The controller of claim 5, wherein the towing vehicle status signals include at least three of longitudinal acceleration data of the towing vehicle, lateral acceleration data of the towing vehicle, yaw rate data of the towing vehicle, accelerator pedal data of the towing vehicle, brake pedal data of the towing vehicle, wheel speed data of the towing vehicle, and vehicle braking status data of the towing vehicle.

7. The controller of 5, wherein the towing vehicle status signals include at least one of ON/OFF status data and operation mode data of the towing vehicle mounted brake controller.

8. The controller of 5, wherein the trailer status signals include at least one of longitudinal acceleration data of the trailer, lateral acceleration data of the trailer, yaw rate data of the trailer, wheel speed data of the trailer, brake operation data of the trailer, ON/OFF status data of the trailer, operation mode data of the trailer mounted brake controller of the trailer, trailer status information data of the trailer, and driver information data of the trailer.

9. The controller of claim 5, further comprising a signal output via which an indicator signal, which depends on the trailer status signals, can be output in the towing vehicle.

10. A towing vehicle comprising a towing vehicle mounted brake controller for controlling operation of brakes in a towing vehicle, the towing vehicle mounted brake controller including:
- a first signal interface via which trailer status signals, relating to at least one of a current driving status of a trailer towed by the towing vehicle and an operation status of a trailer mounted brake controller mounted on or in the trailer, can be received from sensors in the trailer;
- a second signal interface via which towing vehicle status signals, relating to a current driving status of the towing vehicle, can be received from at least one of sensors and controllers in the towing vehicle;
- a signal processor, wherein the signal processor is configured to generate brake control signals taking into account both the towing vehicle status signals and the trailer status signals; and
- a third signal interface via which the brake control signals are transmittable to brakes of the towing vehicle.

11. A brake controller system comprising:
- a towing vehicle mounted brake controller for controlling operation of brakes in a towing vehicle; and
- a trailer mounted brake controller for controlling operation of brakes in a trailer being towed by the towing vehicle;

wherein:
  the trailer mounted brake controller includes:
  - a first trailer signal interface via which trailer status signals, relating to a current driving status of the trailer, can be received from sensors in the trailer;
  - a second trailer signal interface via which at least one of an operation status of the towing vehicle mounted brake controller and towing vehicle status signals relating to a current driving status of the towing vehicle can be received from at least one of sensors and controllers in the towing vehicle;
  - a trailer signal processor, wherein the trailer signal processor is configured to generate trailer brake control signals taking into account both the trailer status signals and the towing vehicle status signals; and
  - a third trailer signal interface via which the trailer brake control signals are transmittable to brakes of the trailer; and the towing vehicle mounted brake controller includes:
  - a first towing vehicle signal interface via which at least one of an operation status of the trailer mounted brake controller and the trailer status signals can be received from sensors in the trailer;
  - a second towing vehicle signal interface via which the towing vehicle status signals can be received from at least one of sensors and controllers in the towing vehicle;
  - a towing vehicle signal processor, wherein the towing vehicle signal processor is configured to generate towing vehicle brake control signals taking into account both the towing vehicle status signals and the trailer status signals; and
  - a third towing vehicle signal interface via which the towing vehicle brake control signals are transmittable to brakes of the towing vehicle.

12. A trailer comprising a trailer mounted brake controller for controlling operation of brakes in the trailer, the trailer mounted brake controller including:
- a first signal interface via which trailer status signals, relating to a current driving status of the trailer, can be received from sensors in the trailer;
- a second signal interface via which towing vehicle status signals, relating to at least one of a current driving status of a towing vehicle towing the trailer and an operation status of a towing vehicle mounted brake controller mounted on or in the towing vehicle, can be received from at least one of sensors and controllers in the towing vehicle;
- a signal processor, wherein the signal processor is configured to generate brake control signals taking into account both the trailer status signals and the towing vehicle status signals; and
- a third signal interface via which the brake control signals are transmittable to brakes of the trailer.

13. A vehicle train comprising:
- a towing vehicle that includes a towing vehicle mounted brake controller for controlling operation of brakes in the towing vehicle;
- a trailer being towed by the towing vehicle and including a trailer mounted brake controller for controlling operation of brakes in the trailer; and
- a vehicle communication network interconnecting the towing vehicle mounted brake controller and the trailer mounted brake controller;

wherein:
  the trailer mounted brake controller includes:
  - a first trailer signal interface via which trailer status signals, relating to a current driving status of the trailer, can be received from sensors in the trailer;
  - a second trailer signal interface via which at least one of an operation status of the towing vehicle mounted brake controller and towing vehicle status signals relating to a current driving status of the towing vehicle can be received, via the communication network, from at least one of sensors and controllers in the towing vehicle;
  - a trailer signal processor, wherein the trailer signal processor is configured to generate trailer brake control signals taking into account both the trailer status signals and the towing vehicle status signals; and
  - a third trailer signal interface via which the trailer brake control signals are transmittable to brakes of the trailer;

the towing vehicle mounted brake controller includes:
  - a first towing vehicle signal interface via which at least one of an operation status of the trailer mounted brake controller and the trailer status signals can be received, via the communication network, from sensors in the trailer;
  - a second towing vehicle signal interface via which the towing vehicle status signals can be received from at least one of sensors and controllers in the towing vehicle;
  - a towing vehicle signal processor, wherein the towing vehicle signal processor is configured to generate towing vehicle brake control signals taking into account both the towing vehicle status signals and the trailer status signals; and
  - a third towing vehicle signal interface via which the towing vehicle brake control signals are transmittable to brakes of the towing vehicle; and at least one of:
- the at least one of the operation status of the towing vehicle mounted brake controller and the towing vehicle status signals are transmittable to the second trailer signal interface from the at least one of sensors and the controllers in the towing vehicle via the communication network; and
- the at least one of the operation status of the trailer mounted brake controller and the trailer status signals are transmittable to the first towing vehicle signal interface via the communication network.

14. The vehicle train of claim 13, wherein the at least one of the operation status of the towing vehicle mounted brake controller and the towing vehicle status signals are transmittable to the second trailer signal interface from the at least one of sensors and the controllers in the towing vehicle via the communication network.

15. The vehicle train of claim 13, wherein the at least one of the operation status of the trailer mounted brake controller and the trailer status signals are transmittable to the first towing vehicle signal interface via the communication network.

16. The vehicle train of claim 13, wherein both (a) the at least one of the operation status of the towing vehicle mounted brake controller and the towing vehicle status signals are transmittable to the second trailer signal interface from the at least one of sensors and the controllers in the towing vehicle via the communication network, and (b) the at least one of the operation status of the trailer mounted brake controller and the trailer status signals are transmittable to the first towing vehicle signal interface via the communication network.

17. The vehicle train of claim 13, wherein the vehicle communication network is a CAN-bus network, a Flex-ray network, a LIN network, or an Ethernet network.

18. The vehicle train of claim 13, wherein the vehicle communication network is configured to transmit signals bidirectionally between the towing vehicle and the trailer.

* * * * *